(12) United States Patent
Park

(10) Patent No.: US 8,596,421 B2
(45) Date of Patent: Dec. 3, 2013

(54) STOPPER APPARATUS FOR ROLLER WHEEL

(76) Inventor: Moon Hwan Park, Busan (KR)

( * ) Notice: Subject to any disclaimer, the term of this patent is extended or adjusted under 35 U.S.C. 154(b) by 24 days.

(21) Appl. No.: 13/382,007

(22) PCT Filed: Jul. 2, 2010

(86) PCT No.: PCT/KR2010/004313
§ 371 (c)(1),
(2), (4) Date: Jan. 3, 2012

(87) PCT Pub. No.: WO2011/002259
PCT Pub. Date: Jan. 6, 2011

(65) Prior Publication Data
US 2012/0111672 A1      May 10, 2012

(30) Foreign Application Priority Data
Jul. 3, 2009 (KR) .................. 10-2009-0060488

(51) Int. Cl.
*B62B 5/04* (2006.01)
(52) U.S. Cl.
USPC ........................................ 188/19; 188/20
(58) Field of Classification Search
USPC ........ 188/1.12, 19, 20, 31, 68, 69; 280/47.38; 16/35 R
See application file for complete search history.

(56) References Cited

U.S. PATENT DOCUMENTS

| | | | |
|---|---|---|---|
| 5,103,530 A * | 4/1992 | Andrisin et al. | 16/20 |
| 5,191,675 A * | 3/1993 | Ishikura | 16/35 R |
| 5,799,366 A * | 9/1998 | Zocco et al. | 16/35 R |
| 6,598,712 B1 * | 7/2003 | Sun | 188/20 |

FOREIGN PATENT DOCUMENTS

| | | |
|---|---|---|
| JP | 06-047003 U | 6/1994 |
| JP | 09-315104 A | 12/1997 |
| KR | 10-1999-0025268 A | 4/1999 |

* cited by examiner

*Primary Examiner* — Christopher Schwartz
(74) *Attorney, Agent, or Firm* — Kile Park Reed & Houtteman PLLC

(57) ABSTRACT

Provided is a stopper apparatus for a roller wheel in which a braking force is not created by an adhesion of a push plate with respect to the surface of a roller wheel, but is generated by a stopper wheel that is connected with the roller wheel, to thereby make a rolling operation of the roller wheel stopped by a stop operation of the stopper wheel, and to thus solve a problem of a conventional braking device that is caused by a surface frictional force of the roller wheel, and a braking operation is also performed and released by a locking and unlocking operations between a locking key and the stopper wheel, to thereby enhance a braking capability, increase a convenience of use, and allow the roller wheel to be easily braked by simple manipulation.

4 Claims, 4 Drawing Sheets

STOPPER APPARATUS FOR ROLLER WHEEL

TECHNICAL FIELD

The present invention relates to a stopper apparatus for a roller wheel that is attached to the bottom of a cart, a wagon or, a unit for shifting a structure or transporting heavy stuff, and more particularly, to a stopper apparatus for a roller wheel, including a stopper wheel that is provided at one side of the roller wheel and a locking key that is coupled with the stopper wheel and that is provided in a bracket of the roller wheel, in which the stopper wheel and the locking key are coupled with each other by a fall of the locking key to thereby achieve a locking operation, and the stopper wheel and the locking key are unlocked from with each other by a rise of the locking key to thereby achieve an unlocking operation, and to thus enable the roller wheel to perform a secure stop function, to thus prevent the roller wheel from rolling at a stop time, and to thereby significantly improve a braking force.

BACKGROUND ART

In general, casters are mounted on the bottom of machinery equipment in a variety of industrial fields as well as pianos, chairs or mobile beds for accommodating and transferring patients used in hospitals, carts for transporting goods and carts with which people work, to thereby allow people to easily transport heavy goods or products or machinery.

In addition, a stopper or brake is provided at casters that are roller wheels, respectively, in order to prevent the roller wheels from rolling. This stopper is not provided at respective front and rear legs of the above-described various kinds of wheeled products, but is provided only at the respective front legs or the respective rear legs at most. This is because the wheeled products can be stopped even if only the wheels provided at the front or rear caster are prevented from rolling.

The casters equipped with stoppers or brakes are more expensive than those having no stoppers or brakes. Accordingly, makers that produce the above-described various kinds of wheeled products do not produce wheeled products at all the front and rear legs of which expensive controlled casters are provided, but produce wheeled products at all the front and rear legs of which two types of controlled and uncontrolled casters are provided in combination.

In addition, service lives of casters may become longer or shorter depending on quality of bearings rotatably supporting yoke frames, respectively. For example, if a bearing is of poor quality, a service life of a caster is shorter, but if a bearing is of good quality, a service life of a caster is longer. Thus, manufacturers producing wheeled products such as pianos, chairs, and mobile beds produce wheeled products using casters with bearings whose lives are long.

Most of conventional controlled casters are respectively configured to have a structure that stoppers or brakes are assembled in advance on caster shafts that are rotatably assembled with yoke frames, respectively. Accordingly, the controlled casters with stoppers or brakes should be designed to correspond to yoke frames larger than those of the uncontrolled casters having no stoppers or brakes, because the yoke frames should be able to accommodate the stoppers or brakes.

In addition, since controlled and uncontrolled casters differ from each other in view of specifications of yoke frames, as well as in their structures, these casters cannot help being separately produced through respectively different manufacturing processes.

As described above, since uncontrolled and controlled casters differ from each other in view of their specifications and structures, manufacturers producing wheeled products such as pianos, chairs, and mobile beds should design a structure of legs of the wheeled products in various forms depending on their specifications and structures of the casters with and without having no stoppers or brakes, to thus increase a cost of designing the wheeled products. In addition, uncontrolled and controlled casters should be accurately selected and assembled when the above-described wheeled products are produced, which makes an assembly process of the wheeled products tricky and thus lower a productivity.

Meanwhile, in the case that bearings used for controlled casters are of poor quality but those used for uncontrolled casters are of good quality, manufacturers producing wheeled products may have problems that controlled casters cannot be substituted with uncontrolled casters for legs assembled with the controlled casters and vice versa. Thus, stopper that are assembled with uncontrolled casters, that is, brackets of roller wheels to thus control the roller wheels have been recently being proposed.

As an example, caster stoppers was disclosed in Korean Patent Laid-open Publication No. 10-2005-0006728, entitled "a caster stopper." In this Korean Patent Laid-open Publication No. 10-2005-0006728, a caster includes a yoke frame that is assembled with a bearing support portion and an attachment bolt attached to each leg of various kinds of wheeled products such as pianos, chairs, mobile beds and carts, and a wheel assembled to the yoke frame in a freely rotatable state, and a caster stopper includes a fixing unit and an operating unit. In the fixing unit, the top surface and the right/left surfaces that are attached to each other in a modular type are integrally formed at one side of the yoke frame, so as to surround the opposite outer surface of the bearing support portion. An elastic braking piece that is slantedly protruded downwards toward the rear side to elastically brake the wheel, is formed at the rear end of the top surface of the fixing unit. In the fixing unit, side brackets that are protruded in parallel toward the rear side are integrally formed at the rear ends of the right and left surfaces of the fixing unit. A bearing portion elastically pushes the elastic braking piece, in a state of being assembled rotatably by a shaft pin having both ends fixed to the side brackets. A push plate is integrally formed in the operating unit.

Thus, if the push plate is pressed and attached on the surface of the roller wheel, the rolling operation of the roller wheel is stopped.

However, since the rolling operation of the roller wheel is stopped by the push plate that has been attached on the surface of the roller wheel, in the case of the conventional art, an actual braking force is not large. As a result, the roller wheel happens to roll although the push plate has been pressed to perform a braking action. In addition, since an adhesion force between the push plate and the surface of the roller wheel falls down significantly, in the case that various surrounding dirts are adhered on the surface of the roller wheel or the surface of the wheel is wet at the time of raining, depending on conditions of work sites, the braking force created by the push plate drops significantly. Further, if heavy stuff is loaded on or unloaded from the wheeled products on a slope road, a danger may be caused.

DISCLOSURE OF THE INVENTION

To solve the above problems of the conventional stopper apparatus with roller wheels, it is an object of the present invention to provide a stopper apparatus for a roller wheel in which a braking force is not created by an adhesion of a push plate with respect to the surface of a roller wheel, but is generated by a stopper wheel that is connected with the roller wheel, to thereby make a rolling operation of the roller wheel stopped by a stop operation of the stopper wheel, and to thus solve a problem of a conventional braking device that is caused by a surface frictional force of the roller wheel, and a braking operation is also performed and released by a locking and unlocking operations between a locking key and the stopper wheel, to thereby enhance a braking capability, increase a convenience of use, and allow the roller wheel to be easily braked by simple manipulation.

To accomplish the above object of the present invention, there is provided a stopper apparatus for a roller wheel, the stopper apparatus comprising:

a bracket whose lower portion is coupled to a wheel axis of the roller wheel and on one lateral surface of which a guide hole is penetrated;

a stopper wheel that is combined with the wheel axis of the roller wheel coupled with the bracket and along the circumferential portion of which a plurality of stop gear protrusions are radially formed;

a locking key that is coupled by a coupling bolt that is penetratively connected toward a guide hole of the bracket to then be positioned between the bracket and the roller wheel, and on the bottom of which a locking piece corresponding to the stop gear protrusions of the stopper wheel is formed; and a locking unit that is located on an outer surface of the bracket, coupled by a coupling pin, formed of an insertion hole through which the coupling bolt that has been penetratively coupled with the guide hole of the bracket, and makes the coupling bolt that is connected with the locking key move up and down to thus escalate the locking key.

Preferably but not necessarily, the stopper wheel is positioned on one surface of the roller wheel that is axially attached to the wheel axis, and is integrally formed with the roller wheel.

Preferably but not necessarily, the stopper wheel is positioned on one surface of the roller wheel that is axially attached to the wheel axis, and is configured in a separation form so as to be coupled with the wheel axis on which the roller wheel has been axially formed.

Preferably but not necessarily, the stopper apparatus further comprises a locking groove and an unlocking groove on one surface of the bracket, in which the locking unit comprises:

a ball that is inserted into the locking groove or the unlocking groove by rotation of the upper and lower portions of the locking unit;

a spring supporting the ball;

a control bolt adjusting tension of the spring; and an accommodation unit into which the ball, the spring and the control bolt are inserted, and accommodates the ball, the spring and the control bolt therein.

BRIEF DESCRIPTION OF THE DRAWINGS

The above and other objects and advantages of the present invention will become more apparent by describing the preferred embodiments thereof in detail with reference to the accompanying drawings in which.

BEST MODE FOR CARRYING OUT THE INVENTION

Figure 1:
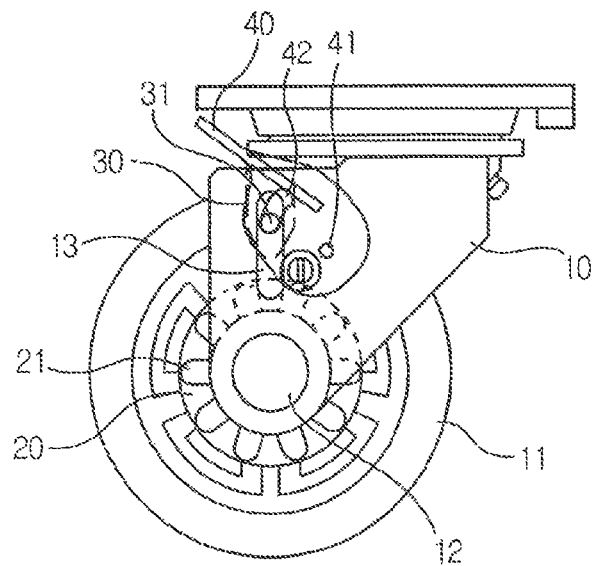
FIG. 1 is a configurational diagram showing a configuration of a stopper apparatus for a roller wheel according to the present invention.
Figure 2:
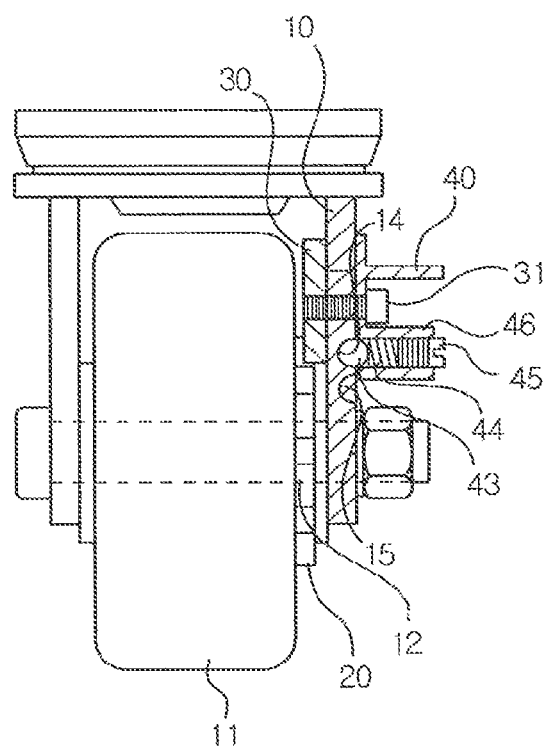
FIG. 2 is a cross-sectional view showing a configuration of a stopper apparatus for a roller wheel according to the present invention.
Figure 3:
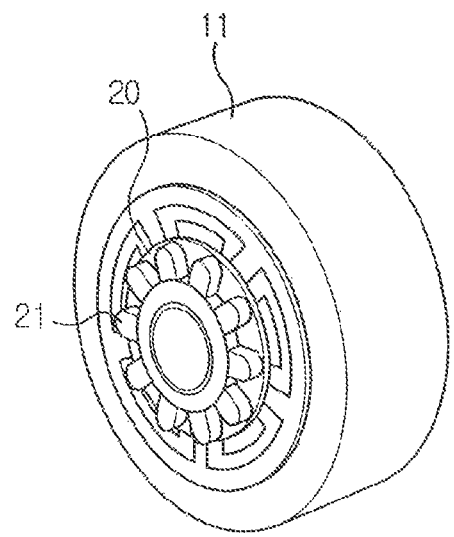
FIG. 3 is a perspective view showing a stopper wheel that is an essential element of a configuration of a stopper apparatus for a roller wheel according to the present invention has been mounted with the roller wheel.

Hereinbelow, a stopper apparatus for a roller wheel according to a preferred embodiment of the present invention will be described in more detail with reference to the accompanying drawings. In describing the structure and function of the stopper apparatus for a roller wheel according to the preferred embodiment of the present invention, terminology or wordings that are used in the specification and claims of the present application should be understood by meanings and concepts that match technical spirits of the present invention based on a principle that an inventor or inventors can define the meanings and concepts of the terminology or wordings appropriately in order to explain the present invention in the most preferable manner.

As shown in FIGS. 1 through 7, a stopper apparatus for a roller wheel, the stopper apparatus according to the present invention includes: a bracket 10 whose lower portion is coupled to a wheel axis 12 of the roller wheel 11 and on one lateral surface of which a guide hole 13 is penetrated; a stopper wheel 20 that is combined with the wheel axis 12 of the roller wheel 11 coupled with the bracket 10 and along the circumferential portion of which a plurality of stop gear protrusions 21 are radially formed; a locking key 30 that is coupled by a coupling bolt 31 that is penetratively connected toward a guide hole 13 of the bracket 10 to then be positioned between the bracket 10 and the roller wheel 11, and on the bottom of which a locking piece 32 corresponding to the stop gear protrusions 21 of the stopper wheel 20 is formed; and a locking unit 40 that is located on an outer surface of the bracket 10, coupled by a coupling pin 41, formed of an insertion hole 42 through which the coupling bolt 31 that has been penetratively coupled with the guide hole 13 of the bracket 10, and makes the coupling bolt 31 that is connected with the locking key 30 move up and down to thus escalate the locking key 30.

The bracket 10 plays a role of a unit that surrounds the outside of the roller wheel 11. In the stopper apparatus for the roller wheel according to the present invention, the guide hole 13 is further penetratively formed on one lateral surface of the bracket 10.

In addition, the guide hole 13 is preferably formed into an elongate shape so as to lengthily extend from the top portion to the lower portion with respect to one lateral surface of the bracket 10 in order to enable the coupling bolt 31 coupled with the locking key 30 to move up and down.

The stopper wheel 20 is positioned on one surface of the roller wheel 11 that is axially attached to the wheel axis 12, and is integrally formed with the roller wheel 11. Alternatively, the stopper wheel 20 is positioned on one surface of the roller wheel 11 that is axially attached to the wheel axis 12, and is configured in a separation form so as to be coupled with the wheel axis 12 on which the roller wheel 11 has been axially formed.

A number of the stop gear protrusions 21 that are formed radially along the circumference of the stopper wheel 20, are core components of the stopper apparatus for the roller wheel according to the present invention. A locking piece 32 of the locking key 30 is inserted into or released from the space formed between the stop gear protrusions 21, to thereby brake and release the roller wheel 11.

Figure 6:
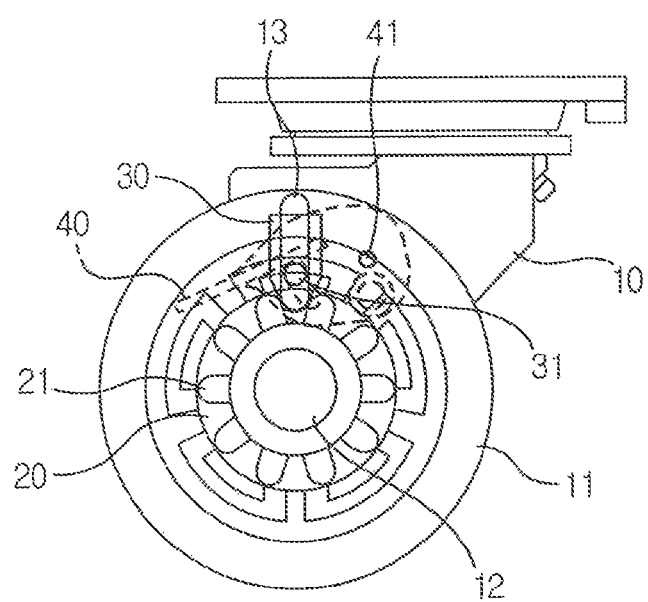
FIG. 6 is a configurational diagram showing a state where a locking key has been dropped toward a stopper wheel by a stopper apparatus for a roller wheel according to the present invention.
Figure 7:
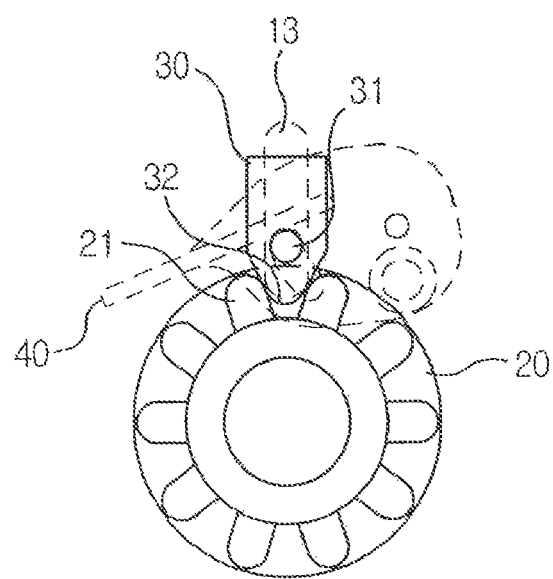
FIG. 7 is an enlarged view of the essential parts of FIG. 6.

If a user presses the locking unit 40, the locking key 30 descends toward the stopper wheel 20 or ascends from the stopper wheel 20, to thereby brake a rolling operation of the stopper wheel 20, and to thus brake a rolling operation of the roller wheel 11 substantially. If the locking unit 40 is pressed by foot, as shown in FIGS. 6 and 7, the coupling bolt 31 of the locking key 30 that is penetratively formed on both the guide hole 13 of the bracket 10 and the insertion hole 42 of the locking unit 40, is pressed to then descend.

As described above, if the coupling bolt 31 descends by a pressing operation of the locking unit 40, the locking key 30 that has been coupled with the coupling bolt 31 descends, and the lower-end locking piece 32 of the locking key 30 is inserted into the space between the stop gear protrusions 21 of the stopper wheel 20 that is located at the lower side of the locking key 30, to thereby brake rotation of the stopper wheel 20 and to accordingly stop and brake the rolling operation of the roller wheel 11 that has been axially attached to the wheel axis 12 in which the stopper wheel 20 has been axially formed.

Figure 4:
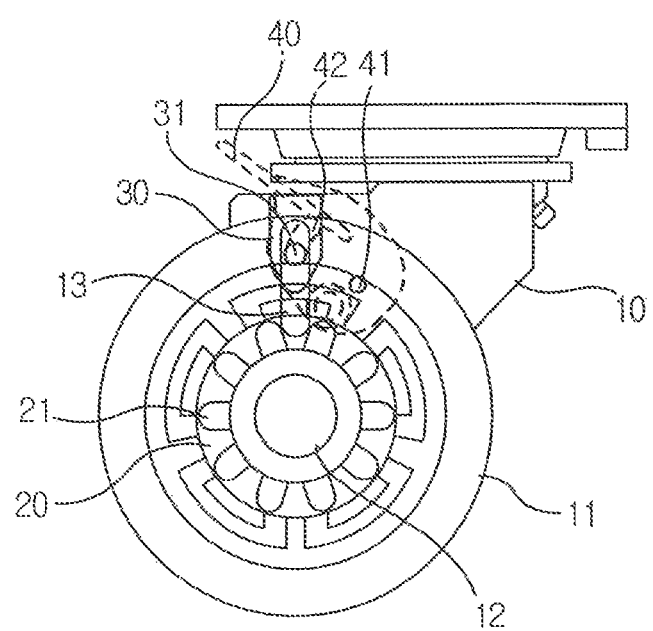
FIG. 4 is a configurational diagram showing a state where a locking key has been elevated from a stopper wheel by a stopper apparatus for a roller wheel according to the present invention.
Figure 5:
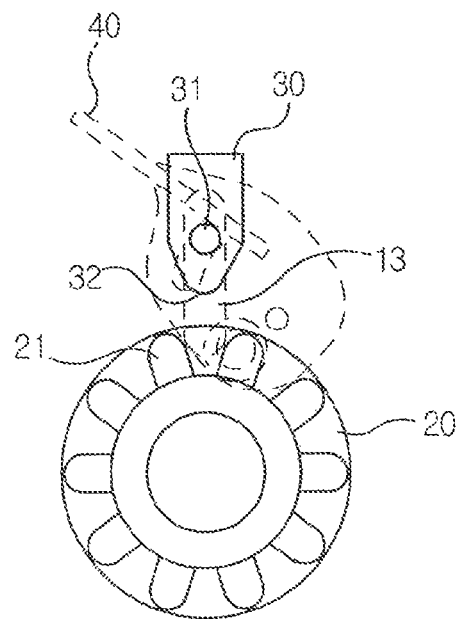
FIG. 5 is an enlarged view of the essential parts of FIG. 4.

In addition, if the depressed locking unit 40 is made to ascend and descend as shown in FIGS. 4 and 5, the coupling bolt 31 of the locking key 30 is escalated along the insertion hole 42 of the locking unit 40, to thereby enable the locking key 30 to ascend and descend with respect to the stopper wheel 20.

Accordingly, the locking piece 32 of the locking key 30 that has been inserted between the stop gear protrusions 21 of the stopper wheel 20 is separated from the space formed between the stop gear protrusions 21, to thus release a braking force of the stopper wheel 20.

As described above, the locking piece 32 of the locking key 30 ascends and descends to then be inserted into and separated from the space formed between stop gear protrusions 21 of the stopper wheel 20, to accordingly brake or release a rolling operation of the roller wheel 11, and to thus prevent the roller wheel from rolling or moving at the time of braking. As a result, the stopper apparatus according to the present invention enables a secure braking, to thus prevent an accident that may be caused by rolling of a transport unit such as stationary mechanical devices, strollers and rolling carts.

The stopper apparatus according to the present invention further includes a locking groove 14 and an unlocking groove 15 on one surface of the bracket 10, in which the locking unit 40 includes: a ball 43 that is inserted into the locking groove 14 or the unlocking groove 15 by rotation of the upper and lower portions of the locking unit 40; a spring 44 supporting the ball 43; a control bolt 45 adjusting tension of the spring 44; and an accommodation unit 46 into which the ball 43, the spring 44 and the control bolt 45 are inserted, and accommodates the ball 43, the spring 44 and the control bolt 45 therein.

The locking groove 14 and the unlocking groove 15 that are formed on one surface of the bracket 10, respectively, play a role of firmly supporting and fixing position of the locking unit 40 that is pressed or released at the ascending and descending operations of the locking key 30. Accordingly, the locking unit 40 that has been pressed at the braking time of the roller wheel 11 is prevented from lifting up at a state where an artificial force is not applied. In addition, the control bolt 45 is tightened or released, to thus adjust a tensile force of the spring 44 and control strength of the ball 43 that is pressed and supported by the spring 44.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

Effects of the Invention

A stopper apparatus for a roller wheel according to the present invention further includes a stopper wheel at one side of a roller wheel, in which a locking key that is inserted between stop gear protrusions of the stopper wheel is formed on one surface of a bracket that is combined on a wheel axis at which the roller wheel is axially formed. Accordingly, the stopper wheel is braked by descending of the locking key, to thereby brake the roller wheel, and to thus greatly improve a braking force. In addition, rotation of the roller wheel is controlled by braking rotation of the wheel axis at which the roller wheel has been axially formed not by a surface adhesion force of the roller wheel, to thereby enhance a braking force effectively and braking the roller wheel easily.

In addition, the locking key is descendent by an action of pressing the locking unit by foot, to thus brake rotation of the stopper wheel and thereby achieve easy manipulation. Further, the stopper apparatus according to the present invention can be applied to roller wheels that are attached on the bottom of transportation units such as handcarts, structures, carts, machinery, lathes, and pianos, to thus greatly enlarge a range of use and greatly enhance usability.

What is claimed is:

1. A stopper apparatus for a roller wheel, the stopper apparatus comprising:
   a bracket whose lower portion is coupled to a wheel axis of the roller wheel and on one lateral surface of which a guide hole is penetrated;
   a stopper wheel that is combined with the wheel axis of the roller wheel coupled with the bracket and along the circumferential portion of which a plurality of stop gear protrusions are radially formed;
   a locking key that is coupled with the bracket by a coupling bolt that is penetratively connected toward a guide hole of the bracket in which the locking key is positioned between the bracket and the roller wheel, and on the bottom of which a locking piece corresponding to the stop gear protrusions of the stopper wheel is formed; and
   a locking unit that is located and coupled on an outer surface of the bracket by a coupling pin and includes an insertion hole through which the coupling bolt is penetratively coupled with the guide hole of the bracket in which the locking unit makes the coupling bolt that is connected with the locking key move up and down to thus escalate the locking key.

2. The stopper apparatus according to claim 1, wherein the stopper wheel is positioned on one surface of the roller wheel that is axially attached to the wheel axis, and is integrally formed with the roller wheel.

3. The stopper apparatus according to claim 1, wherein the stopper wheel is positioned on one surface of the roller wheel that is axially attached to the wheel axis, and is configured in a separation form so as to be coupled with the wheel axis on which the roller wheel has been axially formed.

4. The stopper apparatus according to claim 1, further comprising a locking groove and an unlocking groove on one surface of the bracket, wherein the locking unit comprises:
- a ball that is inserted into the locking groove or the unlocking groove by rotation of the upper and lower portions of the locking unit;
- a spring supporting the ball;
- a control bolt adjusting tension of the spring; and
- an accommodation unit into which the ball, the spring and the control bolt are inserted, and accommodates the ball, the spring and the control bolt therein.

* * * * *